United States Patent
Berger et al.

(10) Patent No.: US 6,641,191 B1
(45) Date of Patent: Nov. 4, 2003

(54) METHOD AND APPARATUS FOR ATTACHING COSMETIC BODY PANELS TO A COMPOSITE TRUCK CARGO BOX

(75) Inventors: Elisabeth J. Berger, Farmington Hills, MI (US); Jessica A. Schroeder, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/071,264

(22) Filed: Feb. 7, 2002

(51) Int. Cl.⁷ ............................................... B62D 27/04
(52) U.S. Cl. ........................ 296/29; 296/198; 296/901
(58) Field of Search ............................ 296/29, 30, 198, 296/901; 52/573.1

(56) References Cited

U.S. PATENT DOCUMENTS

| | | | |
|---|---|---|---|
| 4,438,971 A | 3/1984 | Zaydel et al. ................ | 296/191 |
| 4,496,188 A * | 1/1985 | Ezell et al. ............ | 296/190.07 |
| 4,529,244 A | 7/1985 | Zaydel ........................ | 296/191 |
| 4,607,877 A * | 8/1986 | Shelton ....................... | 296/191 |
| 4,620,745 A * | 11/1986 | Jacobs ........................ | 296/198 |
| 4,627,655 A * | 12/1986 | Collins ....................... | 296/167 |
| 4,944,612 A | 7/1990 | Abstetar et al. ........... | 296/39.2 |
| 4,973,102 A * | 11/1990 | Bien .......................... | 296/187 |
| 4,998,769 A | 3/1991 | Johnson et al. ............. | 296/183 |
| 5,052,737 A | 10/1991 | Farmer, Jr. ................. | 296/39.2 |
| 5,139,306 A * | 8/1992 | Ott et al. .................... | 296/198 |
| 5,228,742 A | 7/1993 | Johnson et al. ............. | 296/191 |
| 5,249,834 A | 10/1993 | Johnson et al. ............. | 296/35.1 |
| 5,584,521 A | 12/1996 | Hathaway et al. ............ | 296/36 |
| 5,636,893 A | 6/1997 | Wheatley et al. ........... | 296/100 |
| 6,135,517 A * | 10/2000 | Cordebar ..................... | 293/155 |
| 6,209,940 B1 * | 4/2001 | Jocher et al. ................. | 296/29 |

FOREIGN PATENT DOCUMENTS

| | | | | |
|---|---|---|---|---|
| DE | 3734371 A1 | * | 5/1989 | ................ 296/191 |
| JP | 59034982 A | * | 2/1984 | ................ 296/198 |
| JP | 60202178 A | * | 10/1985 | ................ 180/297 |
| JP | 62131815 A | * | 6/1987 | ................ 296/29 |
| JP | 62028307 A | * | 12/1987 | ................ 296/198 |
| JP | 01016479 A | * | 1/1989 | ................ 296/29 |

OTHER PUBLICATIONS

Article "Keep on Truckin" by Jody Schwartz, SSC–sia.com website of Sovereign Specialty Chemicals, Chicago, IL., 2 pages, dated Oct. 5, 2000.
News Release: "GM to Offer Composite Pickup Truck box" SSC–sia.com website of Sovereign Specialty Chemicals, Chicago, IL., 3 pages, dated Aug. 5, 1999.

* cited by examiner

Primary Examiner—Joseph D. Pape
Assistant Examiner—Paul Chenevert
(74) Attorney, Agent, or Firm—Kathryn A. Marra

(57) ABSTRACT

A method for attaching a cosmetic body panel to a composite cargo box without inclusion of a conventional integral lip. The cargo box sidewalls are formed without integral lips. A metallic lip member is bonded to the peripheral top rail at the top of the sidewalls, wherein the lip member is configured so as to mimic the surface contour (geometry) of a conventional integral lip, including the slot, notches and wedge shape thereof for like attaching of a cosmetic body panel thereto.

17 Claims, 4 Drawing Sheets

METHOD AND APPARATUS FOR ATTACHING COSMETIC BODY PANELS TO A COMPOSITE TRUCK CARGO BOX

TECHNICAL FIELD

The present invention relates to pick-up trucks having composite cargo boxes, and more particularly to a method for attaching cosmetic body panels thereto.

BACKGROUND OF THE INVENTION

The metal cargo box of a pick-up truck is subjected to extreme wear over the life of the vehicle, in that this is where a wide spectrum of cargo interacts with the structural members of the truck. One solution to the wear problem has been the introduction of Polymeric bed liners which line the cargo box with the objective of protecting the metallic structural members of the truck from the deleterious effects of cargo interaction. As a practical matter, however, bed liners can actually facilitate corrosion of painted steel members due to water entrapment, and cargo impacts can contribute to corrosion. Indeed, even with a bed liner, the cargo box can be expected to often be the first metal part of a truck which fails over time. Accordingly, a welcomed recent major advance in pick-up truck design has been the introduction by General Motors Corporation of a composite cargo box. Because the cargo box is composite, there is no steel to rust, and there is no need for a bed liner. Advantages of a composite cargo box include weight reduction, durability, low maintenance, and freedom from denting and cargo loading worries.

Composite cargo boxes (and the inside of the tailgate) are formed by a structural reaction injection molding (SRIM) process consisting of a 50/50 mix of urethane and glass fiber. An adhesive, for example PLASTILOCK 731-SI of Sovereign Specialty Chemicals, Inc. of Chicago, Ill. which is a two-part modified epoxy, is used to secure the composite cargo box to the truck frame.

Attached to the cargo box are the cosmetic body panels (fenders). The cosmetic body panels, and the outside of the tailgate, are made of reinforced reaction injection molded (RRIM) materials, chiefly polyurea with mica filler. The attachment is effected by an interference fit between the sidewall of the cargo box and the cosmetic body panel, as well as by a number of retainers.

An example of the current methodology for attachment of cosmetic body panels to a composite cargo box is shown herein at FIGS. 1 through 3 and is described in detail in U.S. Pat. No. 5,228,742 to Johnson et al., the disclosure of which is hereby herein incorporated by reference.

Referring now to FIGS. 1 and 2, the composite cargo box 10 integrally includes, at the top thereof, a peripheral top rail 16F including a horizontal top rail portion 16H and a vertical top rail portion 16V. An L-shaped lip 12 has a base portion 14 which is integral with the cargo box sidewall 16 at the vertical top rail portion 16V, and further has an upstanding wedge shaped portion 20, preferably in the form of a plurality of wedges (best seen at FIG. 2) which is integral with the base portion. The wedge shaped portion 20 is separated from the vertical top rail portion 16V of the cargo box sidewall so as to form a slot 22 at the base portion 14. The integral lip 12 is discontinuous, in that about every 5 inches it is punctuated by periodic notches 24 of about 1.5 inches in length. The cosmetic body panel (fender) 26 has along its upper inside edge a plurality of tabs 28 which are configured to interference fit into the slot 22, wherein there is a tongue 30 between each tab, and wherein each tongue fits into a respective notch 24. As shown at FIG. 2, this interference fit secures the cosmetic body panel to the composite cargo bed along the peripheral top rail 16F of the sidewall; and fasteners 32 supplement the attachment of the composite body panel to the composite, cargo bed.

FIG. 3 depicts a tool for forming the composite cargo box 10, wherein first and second tools 34, 36 collectively form a mold 38. It will be noted that in order to form the integral lip 12 (inclusive of the base portion 14 and the wedge shaped portion 20), a blade 40 of the first tool 34 is necessary. The blade 40 is affected by each cycling of the mold 38, wherein the formed cargo box 10 tends to abrade the blade each time a part is made. Accordingly, the blade 40 requires particular attention and more maintenance than the mold in general.

Accordingly, it would be beneficial if somehow sidewall lips of a composite cargo bed could be provided without a blade being associated with the mold.

SUMMARY OF THE INVENTION

The present invention is a method and apparatus for attaching a cosmetic body panel to a composite cargo box without inclusion of a conventional integral lip.

According to the method of the present invention, the cargo box sidewalls are formed without integral lips. A lip member is bonded to the peripheral top rail at the top of the sidewalls so as to mimic the surface contour (geometry) of a conventional integral lip, including the slot, notches and wedge shape thereof for like attaching of a cosmetic body panel thereto.

The lip member is composed of sheet metal having a base wall; an attachment wall upstanding in relation to the base wall; and a wedge shaped wall connected with the base wall so as to define a wedge shaped surface contour. The wedge shape wall is separated from the attachment wall so as to thereby define a slot therebetween. Each of the slot and wedge shaped wall are configured to mimic corresponding structures of a conventional integral lip of a conventional composite cargo box. To mimic notches of a conventional integral lip, a single lip member may be notched to periodically remove, along the attachment wall, the base and wedge shaped walls, or, alternatively, a plurality of mutually separated lip members may be used.

Further according to the method of the present invention, the attachment wall is attached to the vertical top rail portion of the peripheral top rail of the composite cargo box sidewall. The preferred attachment modality is via a suitable, permanent adhesive. The preferred adhesive is a two-part epoxy which requires no composite surface treatment to be adhesively effective.

In operation, a composite cargo box is formed having sidewalls absent conventional integral lips. At least one lip member is bonded to each sidewall at the peripheral top rail thereof, wherein either a plurality of lip members are provided and mutually separated from its neighbors so as to provide a notch at each of the separations, or a single lip member is provided having a plurality of notches formed therealong. A cosmetic body panel of conventional design is then attached by interference fit to the slot and notches of the at least one lip member.

Accordingly, it is an object of the present invention to provide a composite cargo box formed without conventional integral lips, the sidewalls thereof having at least one lip member bonded thereto.

This and additional objects, features and advantages of the present invention will become clearer from the following specification of a preferred embodiment.

DESCRIPTION OF THE PREFERRED EMBODIMENT

Figure 1:
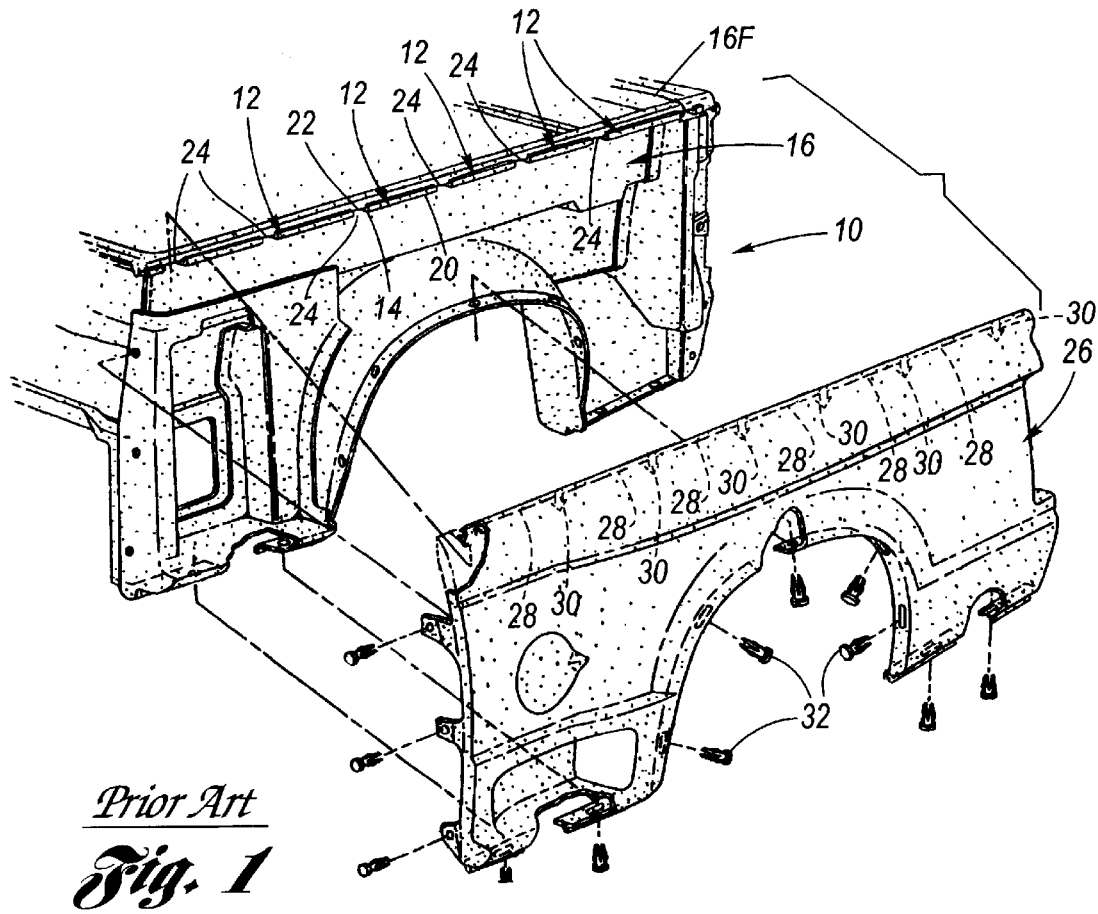
FIG. 1 is an exploded view of a prior art composite cargo box and cosmetic body panel attachable thereto.
Figure 2:
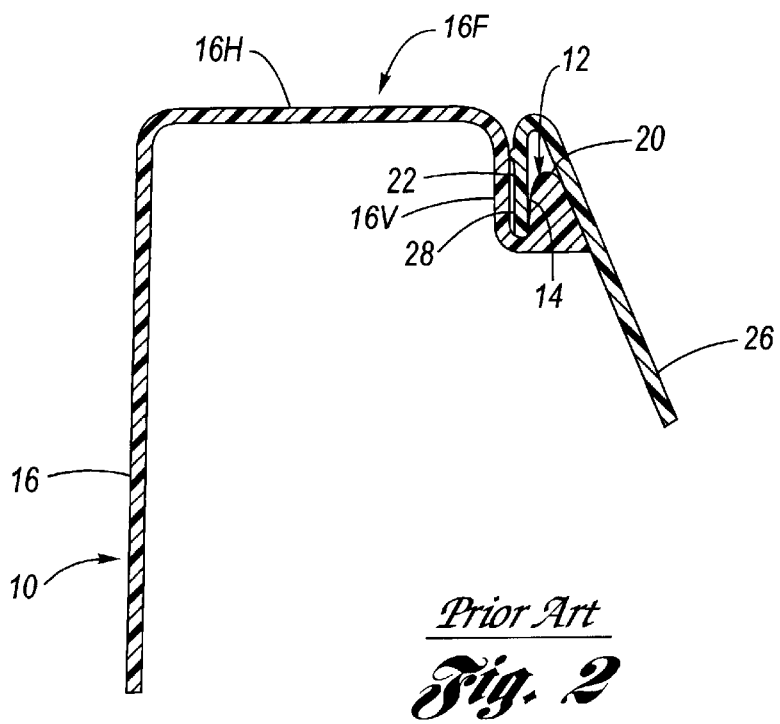
FIG. 2 is an end sectional view showing connection of the cosmetic body panel to the prior art composite cargo box via the integral lip thereof.

Referring now to the Drawing, FIGS. 4 through 9 depict an example of the method, and structural aspects related thereto, according to the present invention. A composite cargo box 100 is formed having sidewalls 102 without conventional integral lips (identified by 12 in FIG. 1) at the peripheral top rail 104, wherein the top rail forms an integral part of the sidewalls. At least one lip member 106 is bonded to each sidewall 102 at the peripheral top rail 104 thereof. Each lip member 106 has a surface contour (geometry) which mimics the surface contour (geometry) of a conventional, integrally formed lip (identified by 12 in FIG. 1). There is, consequently no need for structural modification to the cosmetic body panel 26, which has the aforementioned serially arranged tabs 28 and tongues 30, as shown identically at FIG. 1.

Figure 6:
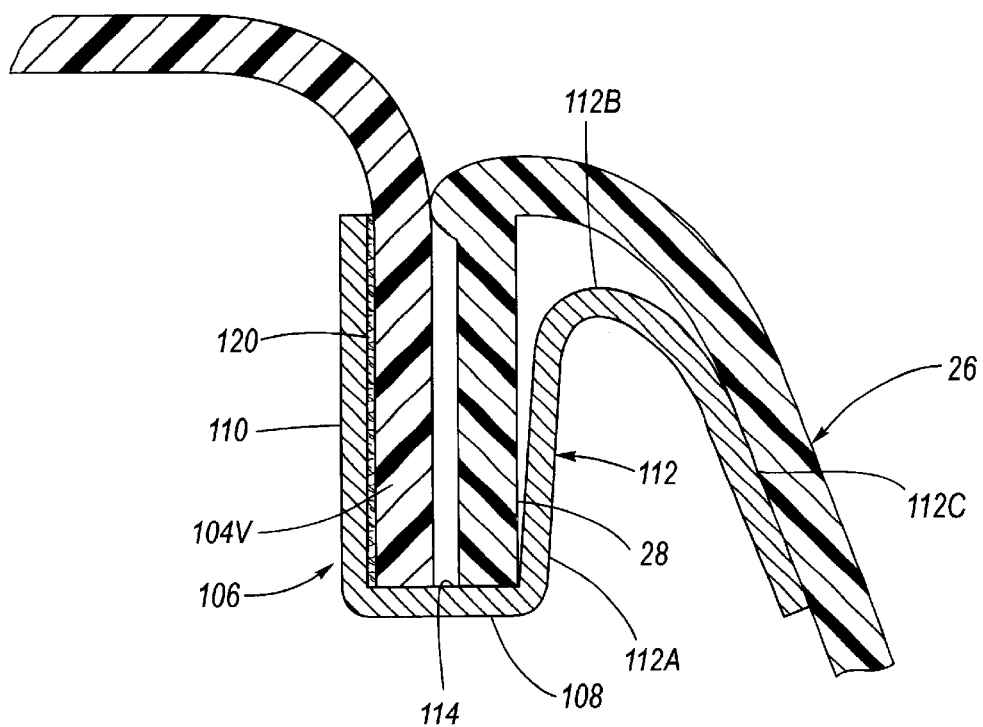
FIG. 6 is a detail view of the connection depicted at FIG. 5.

The preferred lip member 106 is composed of a heavy gauge (i.e., 20 gauge), elongated piece of metal sheet which is bent for example by stamping or rolling. The preferred metal is steel which may be protected from corrosion, as for example by galvanization or electro deposition coating. By way of example, the steel may be 1008–1010 steel, either cold rolled or electrogalvanized or electrogalvanized and then electrocoated, the electrocoating being PPG E-COAT PC 590. As best shown at FIG. 6, the bending of the metal sheet provides the lip member 106 with a base wall 108; an attachment wall 110 integrally connected to the base wall in upstanding relation thereto; and a wedge shaped wall 112 integrally connected to the base wall in upstanding relation thereto and separated from the attachment wall so as to form a slot 114. The wedge shaped wall 112 includes an outer wall portion 112A integrally connected in upstanding relation to the base wall 108; a curved wall portion 112B integrally connected to the outer wall portion 112A, and a generally straight wall portion 112C integrally connected to the curved wall section 112B, wherein the outer wall portion, the curved wall portion and the straight wall portion collectively define a wedge shaped surface contour. Each of the slot and wedge shaped surface contour are configured to mimic corresponding structural features of a conventional integral lip (identified by 12 in FIG. 1) of a conventional composite cargo box (as identified by 10 in FIG. 1).

Figure 7:
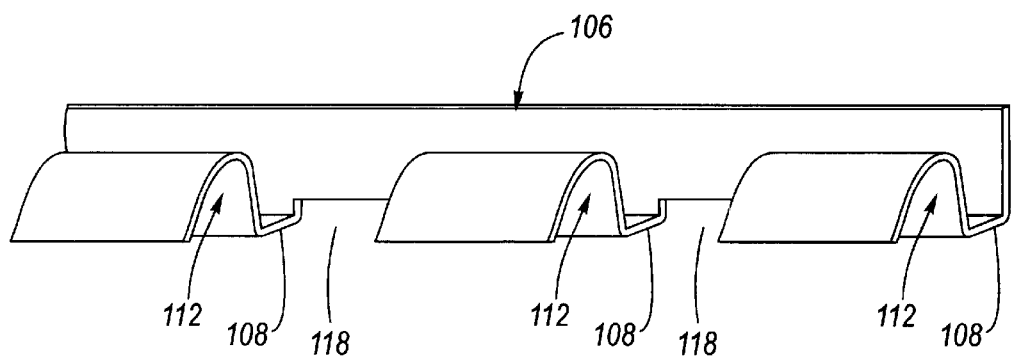
FIG. 7 is a perspective view of a notched lip member according to the present invention.
Figure 8:
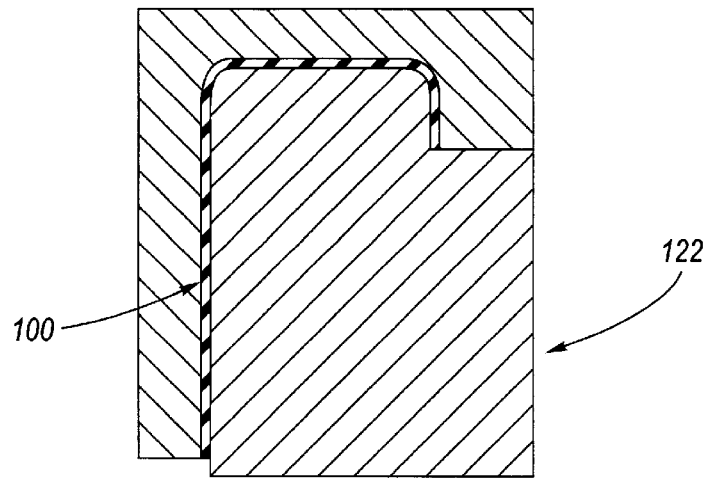
FIG. 8 is a portion of a mold for forming the composite cargo box according to the present invention

To mimic notches (identified by 24 in FIG. 1) of a conventional integral lip (identified by 12 in FIG. 1), FIG. 7 shows a lip member 106 having a plurality of notches 118 located periodically along the attachment wall 110, wherein the base and wedge shaped walls 108, 112 are notched out along a short length of the attachment wall, the length being commensurate with a conventional integral lip. (The attachment wall 110 is, itself, continuous.) Alternatively, a plurality of short lip members may be used, each separated from its neighbor, each separation forming a notch. A plurality of separate lip members may be preferred, in that a failure of the bond of any one of them would not necessarily induce a failure of the separate bonding of the others.

The bonding of the attachment wall 110 is by an adhesive 120 which permanently affixes the attachment wall to the vertical top rail portion 104V of the sidewall 102 of the composite cargo box 100. A suitable, permanent adhesive, is a two-part epoxy which requires no surface pre-treatment to be adhesively effective. An example of such an epoxy is PLASTILOCK 731-SI of the Industrial Division, Sovereign Specialty Chemicals, Inc. of Chicago, Ill.

Figure 3:
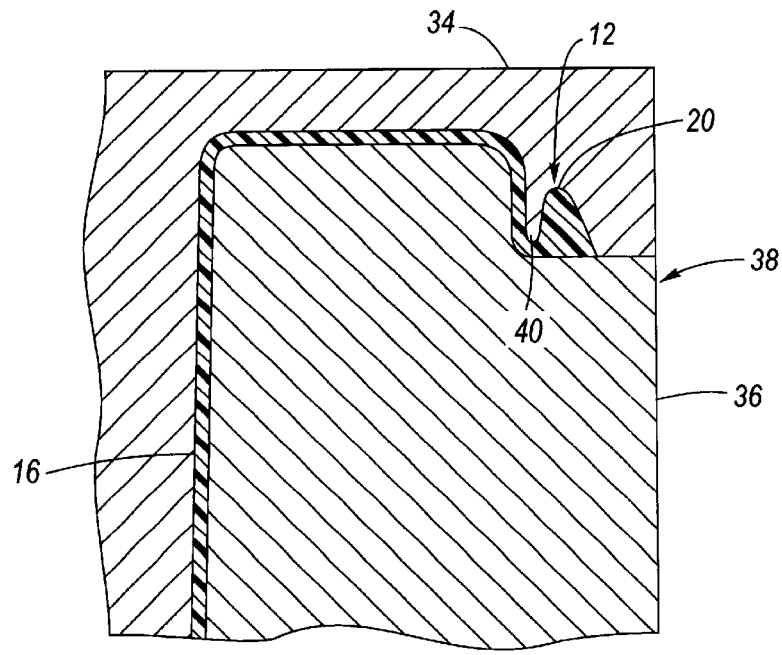
FIG. 3 is a sectional view of a portion of a mold for forming the prior art composite cargo box.
Figure 4:
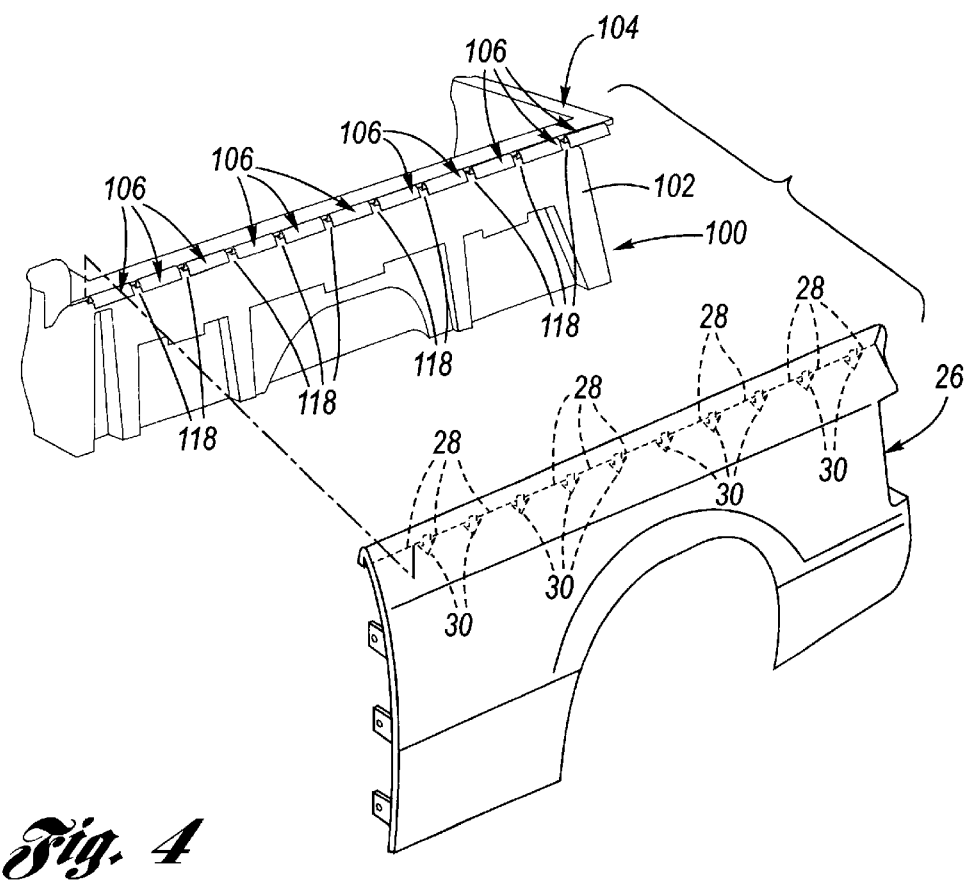
FIG. 4 is an exploded view a of composite cargo box according to the present invention and cosmetic body panel attachable thereto.
Figure 5:
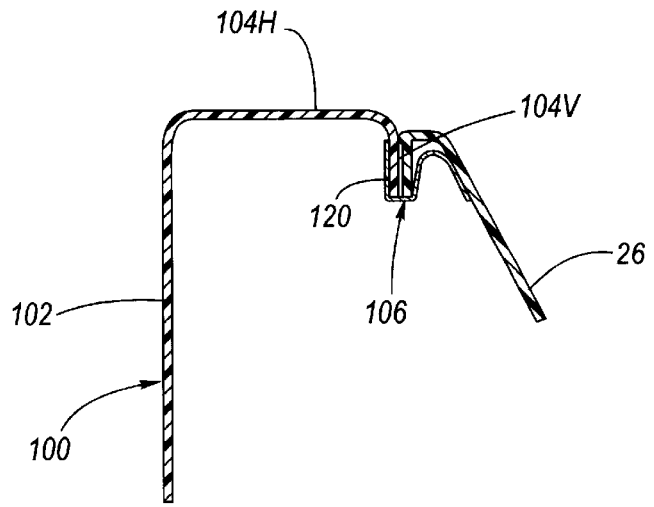
FIG. 5 is an end sectional view showing connection of the cosmetic body panel to the composite cargo box via the lip member thereof according to the method of the present invention.

In operation, a composite cargo box 100 is formed via a mold 122 (see FIG. 8) having sidewalls absent conventional integral lips (identified as 12 in FIG. 3). As shown at FIGS. 5 and 6, the attachment wall 110 of at least one lip member 106 is bonded by an adhesive 120 to the vertical top rail portion 104V at the top of the sidewalls 102. In this regard, either a single lip member is bonded, having a plurality of notches 118 formed therealong, or, alternatively, a plurality of lip members are bonded and mutually separated so as to provide notches, a notch being located at each separation. A cosmetic body panel 26 is then attached in the known attachment manner discussed hereinabove by interference fit of its tabs 28 and tongues 30 with respect to the slot and notches formed by the at least one lip member. Regarding this installation, it will be seen from inspection of FIG. 6, that with the attachment wall 110 bonded to the vertical top rail portion 104V, the vertical top rail portion and the tabs 28 are located in the slot 114 so as to be in general abutment with the base wall 108 and be held together between the vertical top rail and the outer wall portion 112A; further, the straight wall portion 112C of the wedged shaped wall 112 is acutely angled (for example about forty-five degrees) relative to the outer wall portion 112B so as to contact the cosmetic body panel 26.

Figure 9:
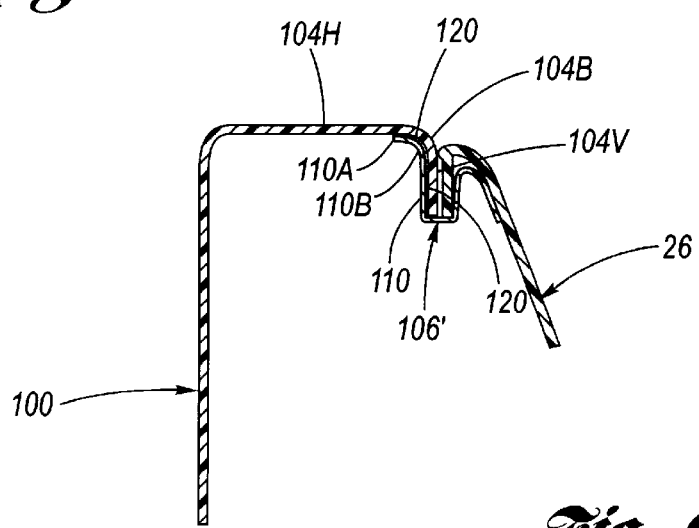
FIG. 9 is a detail view similar to FIG. 5, wherein a modified lip member according to the present invention having an alternative geometry for bonding to a top rail is depicted in operation.

FIG. 9 depicts an alternative lip member 106' wherein the attachment wall 110 has an auxiliary attachment wall 110A having a bend 110B whereat it seamlessly connects with the attachment wall. In this regard, the attachment wall adjoins and is bonded to the vertical top rail portion 104V, the bend 110B generally adjoins and is bonded to the bend 104B of the peripheral top rail 104, and the auxiliary attachment wall 110A adjoins and is bonded to the horizontal top rail portion 104H. The auxiliary attachment wall 110A is also bonded to the sidewall by the same adhesive 120 as the attachment wall 110, and thereby serves to provide an additional bonding location for the lip member relative to the sidewall.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A method for providing lips on a composite cargo box comprising the steps of:
   forming a composite cargo box having a pair of opposing sidewalls;
   fabricating at least one lip member respectively for each sidewall; and
   adhesively bonding to each sidewall its respective at least one lip member.

2. The method of claim 1, wherein said step of adhesively bonding comprises application of an adhesive between each said sidewall and its respective at least one lip member.

3. The method of claim 2, wherein for each lip member said step of fabricating comprises bending an elongated piece of metal sheet, wherein said bending imparts said metal sheet with a base wall, an attachment wall connected with said base wall, and a wedge shaped wall connected with said base wall in spaced relation with respect to said attachment wall so as to thereby provide a slot therebetween.

4. The method of claim 3, wherein said step of bending comprises said wedge shaped wall comprising an outer wall portion connected with said base wall in upstanding relation thereto, a curved wall portion connected with said outer wall portion and a generally straight wall portion connected to said curved wall portion at an acute angle with respect thereto.

5. The method of claim 4, wherein said step of bonding comprises bonding a plurality of said lip members to each said sidewall, wherein each said lip member is separated from each adjoining lip member so as to thereby provide a respective notch at each separation.

6. The method of claim 5, wherein said method further comprises during said step of forming the composite cargo box, forming a peripheral top rail comprising a horizontal top rail portion and a vertical top rail portion; wherein said attachment wall is bonded to said vertical top rail portion.

7. The method of claim 6, wherein said method further comprises:
   for each lip member bending said metal sheet to further include an auxiliary attachment wall connected with said attachment wall; and
   bonding said auxiliary attachment wall to a respective horizontal top rail portion.

8. The method of claim 4, wherein for each lip member said step of fabricating further comprises notching out said base and wedged shaped walls periodically along said attachment wall to thereby provide a plurality of notches in each said lip member.

9. The method of claim 8, wherein said method further comprises during said step of forming the composite cargo box, forming a peripheral top rail comprising a horizontal top rail portion and a vertical top rail portion; wherein said attachment wall is bonded to said vertical top rail portion.

10. The method of claim 9, wherein said method further comprises:
    for each lip member bending said metal sheet to further include an auxiliary attachment wall connected with said attachment wall; and
    bonding said auxiliary attachment wall to a respective horizontal top rail portion.

11. A method for attaching a cosmetic body panel to a composite cargo box comprising the steps of:
    forming a composite cargo box having a pair of opposing sidewalls;
    forming a pair of cosmetic body panels, each cosmetic body panel having serially arranged tabs and tongues connected thereto;
    fabricating at least one lip member respectively for each sidewall, wherein the respective at least one lip member at each side wall provides a slot and a plurality of notches thereat;
    adhesively bonding to each sidewall its respective at least one lip member and
    interference fitting the tabs and tongues of a respective cosmetic body panel with respect to the slot and notches of the at least one lip member of a respective sidewall to thereby attach the cosmetic body panel to the sidewall.

12. The method of claim 11, wherein said step of adhesively bonding comprises application of an adhesive between each said sidewall and its respective at least one lip member.

13. A cargo box comprising:
    a pair of mutually opposed sidewalls and a peripheral top rail connected with said sidewalls, said peripheral top rail comprising a vertical top rail portion and a horizontal top rail portion; and
    at least one lip member adhesively attached to the vertical top rail portion of each sidewall, respectively.

14. The cargo box of claim 13, wherein each said lip member comprises an elongated metal sheet formed so as to include:
    a base wall;
    an attachment wall connected with said base wall; and
    a wedge shaped wall connected with said base wall in spaced relation with respect to said attachment wall so as to thereby provide a slot therebetween.

15. The cargo box of claim 14, wherein said wedge shaped wall comprises:
    an outer wall portion connected with said base wall in upstanding relation thereto;
    a curved wall portion connected with said outer wall portion; and
    a generally straight wall portion connected to said curved wall portion at an acute angle with respect thereto.

16. The cargo box of claim 15, wherein said at least one lip member is attached to its respective sidewall via an adhesive adhering said attachment wall to said vertical top rail portion.

17. The cargo box of claim 16, wherein each said lip member further comprises an auxiliary attachment wall connected with the attachment wall thereof; and wherein said at least one lip member is further attached to its respective sidewall via the adhesive adhering said auxiliary attachment wall to said horizontal top rail portion.

* * * * *